US011880380B1

(12) United States Patent
Christman

(10) Patent No.: US 11,880,380 B1
(45) Date of Patent: Jan. 23, 2024

(54) INTELLIGENT DATA CONTEXTUALIZATION

(71) Applicant: Itron, Inc., Liberty Lake, WA (US)

(72) Inventor: Curtis Christman, Spokane Valley, WA (US)

(73) Assignee: ITRON, INC., Liberty Lake, WA (US)

( * ) Notice: Subject to any disclaimer, the term of this patent is extended or adjusted under 35 U.S.C. 154(b) by 0 days.

(21) Appl. No.: 17/948,617

(22) Filed: Sep. 20, 2022

(51) Int. Cl.
*G06F 16/248* (2019.01)

(52) U.S. Cl.
CPC ................... *G06F 16/248* (2019.01)

(58) Field of Classification Search
CPC ..................................... G06F 16/248
USPC ......................................... 707/748
See application file for complete search history.

(56) References Cited

U.S. PATENT DOCUMENTS

| | | | |
|---|---|---|---|
| 6,529,900 B1* | 3/2003 | Patterson | G06F 16/26 707/999.005 |
| 8,060,259 B2* | 11/2011 | Budhraja | H02J 3/003 709/224 |
| 8,677,235 B2 | 3/2014 | Chronister et al. | |
| 8,812,947 B1 | 8/2014 | Maoz et al. | |
| 9,424,318 B2 | 8/2016 | Anand et al. | |
| 9,928,623 B2 | 3/2018 | Abuelsaad et al. | |
| 10,459,940 B2* | 10/2019 | Prabhu | G06F 16/248 |
| 10,552,435 B2* | 2/2020 | Wang | G06F 16/248 |
| 10,817,534 B2 | 10/2020 | Prabhu et al. | |
| 11,334,582 B1* | 5/2022 | Reyes | G06F 16/2428 |
| 11,409,756 B1* | 8/2022 | Park | G06F 16/254 |
| 2003/0009401 A1* | 1/2003 | Ellis | G06Q 30/04 705/35 |
| 2003/0071814 A1* | 4/2003 | Jou | G06F 9/542 345/440 |
| 2004/0181543 A1 | 9/2004 | Wu et al. | |
| 2010/0156889 A1* | 6/2010 | Martinez | G06F 16/248 345/418 |
| 2012/0271671 A1* | 10/2012 | Zaloom | G06Q 10/0639 705/7.11 |
| 2013/0103677 A1* | 4/2013 | Chakra | G06F 16/904 707/723 |

(Continued)

OTHER PUBLICATIONS

Protopsaltis, Antonis, et al., "Data Visualization in Internet of Things: Tools, Methodologies, and Challenges", ARES '20, Virtual Event, Ireland, Aug. 2020, Article No. 110, pp. 1-1.*

(Continued)

*Primary Examiner* — Robert Stevens
(74) *Attorney, Agent, or Firm* — Lee & Hayes P.C.

(57) ABSTRACT

Techniques for contextualizing utility visualization patterns in a utility infrastructure environment are described herein. A utility meter data dashboard associated with a type of event may be displayed. A selection of a portion of a first utility visualization displayed in the utility meter data dashboard is received, the portion being associated with a subset of utility data. One or more previously used utility visualizations may be determined from among a plurality of additional utility visualizations. One or more candidate utility visualizations associated with the type of event may be determined from among the previously used utility visualizations. A ranked list of one or more candidate utility visualizations may be displayed. A second utility visualization may be displayed based at least in part on a selection from the ranked list.

20 Claims, 7 Drawing Sheets

(56) References Cited

U.S. PATENT DOCUMENTS

| | | | |
|---|---|---|---|
| 2017/0060367 A1 | 3/2017 | Berlingerio et al. | |
| 2018/0165847 A1 | 6/2018 | Broadbent et al. | |
| 2018/0191867 A1 | 7/2018 | Siebel et al. | |
| 2020/0250472 A1* | 8/2020 | Abhyankar | G06F 18/2411 |
| 2022/0229870 A1* | 7/2022 | Chaudhary | G06F 9/451 |

OTHER PUBLICATIONS

Elias, Micheline, et al., "Exploration Views: Understanding Dashboard Creation and Customization for Visualization Novices", Interact 2011, Part IV, LNCS 6949, © IFIP International Federation for Information Processing, 2011, pp. 274-291.*

"Insights at the speed of business," Tableau Desktop, retrieved at <<https://www.tableau.com/products/desktop?utm_campaign_id=2017049&utm_campaign=Prospecting-ALL-ALL-ALL-ALL-ALL&utm_medium=PaidSearch&utm_source=Google+Search&utm_language=EN&utm_country=USCA&kw=&adgroup=CTX-Trial-Products-DSA&adused=DSA&matchtype=&placement=&d=7013y000000vYhH&gclid=CjwKCAjw-8qVBhANEiwAfjXLrh_t3zBlltVHTBNhb6F1gtP-2rbF4bsW1qYrx-pftVnN42XAbGAQfhoCweQQAvD_BwE&gcisrc=aw.ds>>, on Sep. 20, 2022, 14 pages.

"Qlik, Analytics & Data Integration Platform," retrieved at <<https://www.qlik.com/us/>> on Sep. 20, 2022, 8 pages.

"Business Analytics Software," Sigma Computing, retrieved at <<https://www.sigmacomputing.com/product/features/?utm_source=google&utm_medium=cpc&utm_campaign=&utm_term=microsoft%20bi%20reporting&utm_content=589952545625&gclid=CjwKCAjw-8qVBhANEiwAfjXLrkNvYL1flaZvgFbyYn9xlelJW8zdNgMNjQm0s-lk5p9LjL8BZwoS3BoCnLsQAvD_BwE>> on Sep. 20, 2022, 13 pages.

The PCT Search Report and Written Opinion dated Sep. 29, 2023 for PCT application No. PCT/US23/70521, 18 pages.

* cited by examiner

INTELLIGENT DATA CONTEXTUALIZATION

BACKGROUND

Utility companies provide electricity, gas, water, oil, and/or other consumables or services (e.g., sewer, etc.) to consumers. A utility company may offer such services over a considerable geographic area and to a large number of consumers. Utility companies have increasingly networked their infrastructure, and considerable data is generated from measurement points throughout their systems. The data is usable by operators, who can explore and analyze the data via dashboards, to view visualizations, to discover problems, and to correct them. However, the dashboards do not offer context of use of previously used visualizations. From an operator's perspective, data presentation options provided via the dashboards depend on context and goals, which is different from pre-selected charts that are provided within the dashboards. The context and goals of the operator's data exploration and analysis that results in successful discovery of problems and correcting them may or may not be known by the operator performing the data exploration and analysis. Thus, while dashboards may provide visualizations to operators to discover problems with a utility system that should be addressed, the dashboards do not provide contextualization of previously used utility visualization patterns for operators of those systems. Thus, if the full context associated with the data is not known to the operator, the chances of successfully identifying an underlying problem or otherwise achieving the goal may be lower and/or the time and energy required to achieve the goal may be longer.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

Figure 1:
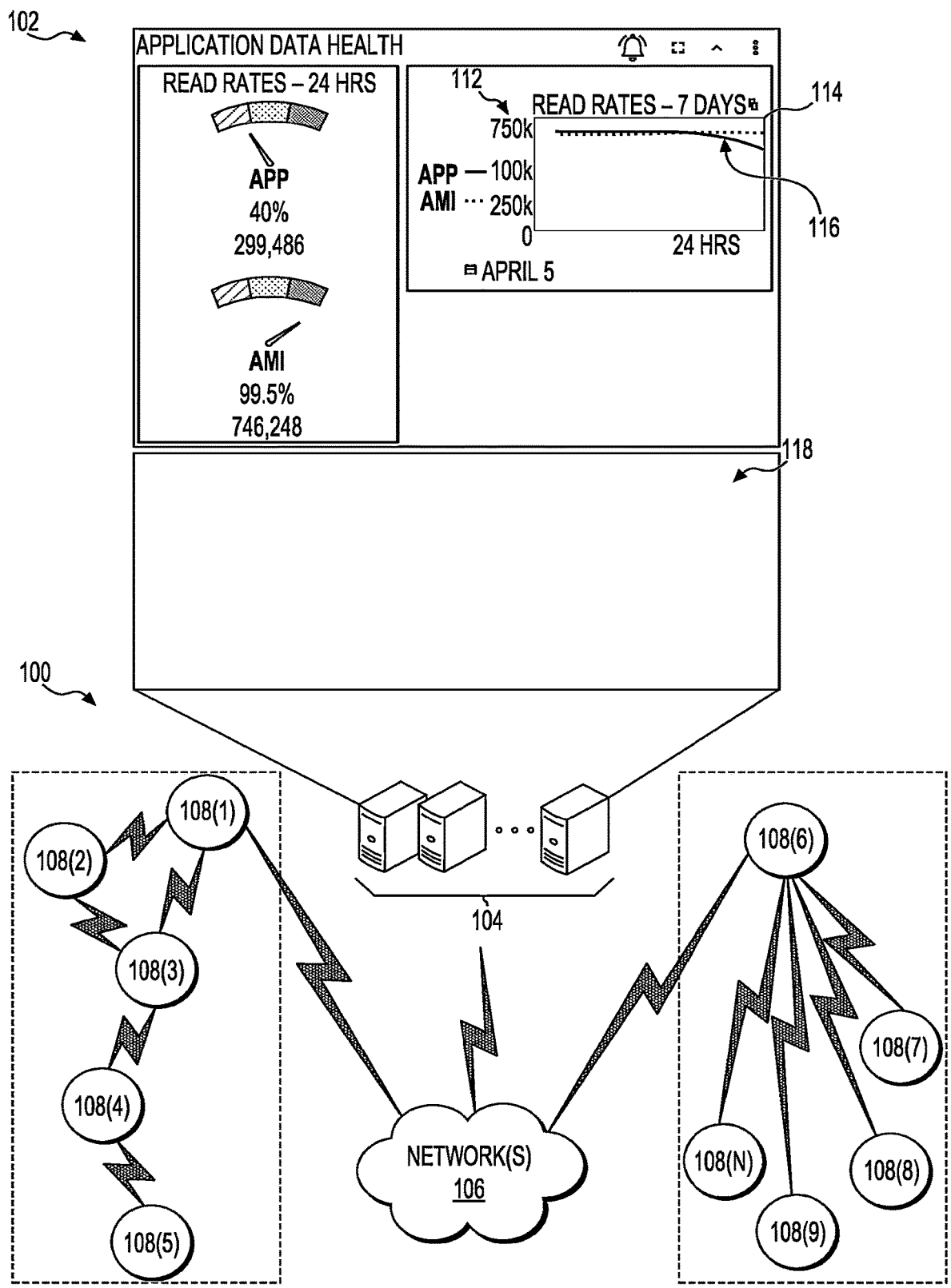
FIG. 1 illustrates a schematic diagram showing an example utility system from which utility data may be obtained, along with an example utility meter data dashboard for analyzing, contextualizing, and visualizing the utility data according to an embodiment in this disclosure.

As discussed above, utility data is usable by operators, who can explore and analyze the data via dashboards, to view visualizations, to discover problems, and to correct them. However, existing dashboards do not offer context of use of previously used visualizations. Thus, if the full context associated with the data is not known to the operator, the chances of successfully identifying an underlying problem or otherwise achieving the goal may be lower and/or the time and energy required to achieve the goal may be longer.

This application describes techniques for providing users of utility analytics dashboards with additional information (e.g., context) to assist their data exploration and analysis. For example, a user may access a meter data dashboard or other data analysis tool in order to assess the performance of a utility meter network, identify a particular type of utility event (e.g., equipment failure, theft, etc.), and/or other objectives. When the user accesses the meter data dashboard or other data analysis tool, the system may present the user with one or more visualizations (e.g., an overview, home view, default view, etc.). The user may make a selection of a portion of one or more of the visualizations (e.g., a selection of a particular graph, table, chart, or portion thereof). Based on an objective of the user accessing the system and the selection, the system may determine one or more additional visualizations that may be relevant to the user's objective. These additional visualizations may be visualizations that have been previously viewed by the user or other users having the same or similar objectives and/or when selecting the same or similar portions of the visualization. These additional visualizations may be visualizations that led to a successful insight or resolution of the objective. In some examples, these additional visualizations may relate to additional data (e.g., other utility meter data, billing data, map data, weather data, or other third-party data) that the user was not previously analyzing, and may provide additional context for the user. For example, assume a user is analyzing meter data associated with a particular geographic region to try to identify a meter malfunction or outage event. In response the system may determine one or more additional sources of data such as utility distribution topology data indicating geographic locations of power lines, transformers, meters, and/or other utility distribution infrastructure, as well as satellite imagery or semantic map data indicating the presence or absence of trees in the proximity to the utility distribution infrastructure. Such additional data may be indicative of a likelihood of downed power lines or other damage in the utility distribution infrastructure by geographic region. The system may additionally or alternatively suggest a new and different view that shows a high impedance chart, including a process and/or a table, that may provide additional context for the user to identify the meter malfunction or the theft event. In this way, the user is able to better understand the full context as it relates to the meter data being analyzed and, consequently, is able to more quickly and accurately generate visualizations representing the event or objective. Additional details and examples are described further below.

In one example of the techniques, utility data is obtained from a utility system. The utility data may be related to electricity, gas, oil, water, steam, sewer, etc. The utility data may include measurement information indicating consumption and other measures at endpoints, meters, transformers, switches, substations and/or other devices and points throughout the utility system. The utility data may also include utility events, exceptions and/or other utility system or operational data. Utility events may include activities such as a fraud event (a meter bypass event, a meter removal event, a power-down event), a fault event, a false positive meter event, a power-down of service event, a low voltage event, power outage event, transformer failure event, deenergization of a distribution line event, and/or conservation event. Exceptions may include anomalous measurements or other data. Such anomalies may indicate a possible problem. For example, significantly increased consumption may indicate a broken water pipe, while decreased consumption may indicate electrical theft. Additionally, the data may be analyzed using one or more relevant attributes, such as characteristics of the consumer, network and/or environment. Examples of attributes include information that was not obtained from metering devices, such as demographic information (e.g., the consumer is a restaurant, or the consumer's house is over-sized), environmental information (e.g., it's a cold winter day) or economic information. Additionally, attributes and/or a connectivity model or network topology may be used to derive the utility events. Such a connectivity attribute and/or connectivity model can show devices that are connected and/or related to a particular device or node on the network or grid. Such attributes may be used and helpful in deriving utility events.

Utility events may be useful combinations and/or sequences found in data. They may be identified in real time or near real time. They are valuable in that they may be used to monitor and improve the operational health of a utility system, to discover utility theft or diversion, indicate potential safety issues, or for other purposes. A utility event may be formed of "building blocks" including measurement data, exceptions, events, attributes, previously identified utility events, and/or groups or patterns of previously identified utility events.

An event derivation, event inference and/or pattern-based data filtration and/or examination process may be used to identify utility events. The utility data may be filtered or examined to identify patterns of data elements. The patterns may include at least one measurement, exception and/or event. The patterns may be selected and/or based on one or more attributes that are relevant to a consumer. The utility data may be compared to a number of patterns to search for a number of respective utility events. Thus, a utility event may be discovered based at least in part on measurements, exceptions, events, attributes and previously identified utility events. In a specific example, a meter removal event, followed by measurements including a period of lower than normal consumption (which may be considered to be an exception), followed by another meter removal event, may indicate a utility event (e.g., a meter bypass event, a meter removal event, a power down event, etc.). Such utility events, which may be derived by recognition of a plurality of indicative data elements, may indicate electricity theft. In another example, a conservation utility event may include events that relate to utility losses, such as electrical theft, water or gas leaks, and/or other events that indicate loss to a utility system. Utility events may be reported to an operator through operation of a utility meter data dashboard. In one example, the utility events may be prioritized and reported to an operator. In other examples, utility events may be used to initiate action through operation of automated systems.

A utility visualization inference and/or pattern-based utility visualization filtration and/or utility visualization examination process may be used to identify candidate utility visualizations that provide context of previous visualization patterns used to discover utility events. The candidate utility visualizations may be identified from the utility data and associated with a type of utility event. A type of utility event may be a base or atomic event of a reading from a meter sensor (e.g., voltage amount, cubic feet per second, thermal units, wind speed, etc.) and may have a defined type or defined signature. A collection of atomic events as a pattern may be a type of event defined as "high read" event, or "flapper event." For example, a high read event or higher-level event may be theft, which may be a combination of utility meter events combined with other patterns that may include frequency and duration. In general, an event can be determined based occurrence of a distinct measure or set of measures that, when present in the underlying data indicate occurrence of the event. The utility data may be filtered or examined to identify a plurality of additional utility visualizations associated with a subset of the utility data. The plurality of additional utility visualizations may be determined based at least in part on culture based demands, rules, knowledge domains, and measure need to business rules. Culture based demands may be, for example, where companies create and use artifacts (e.g., charts, maps, data displays, etc.) that are specific to the culture of the companies that may be needed for the culture of the company to work and/or communicate efficiently. The rules (e.g., logic) may be developed within an organization, where alerts, key performance initiatives, thresholds, and/or events use the rules developed within the organization. The knowledge base may be a body of information (e.g., intellectual property) that is specific to a domain that may be built and used by an organization. Stated otherwise, and for example, culture based demands may be based at least in part on internal cultural demand for artifacts built and/or used by an organization. The plurality of additional utility visualizations may be filtered or examined to identify previously used utility visualizations that were used by operators. The previously used utility visualizations may have been used by operators to view the subset of the utility data or other utility data having a characteristic in common with the subset of the utility data. The previously used utility visualizations may have been used by a same operator or other operators of the same entity or previous operators of other entities.

The characteristic in common can include a category of utility data (e.g., consumption rate, voltage, current, impedance, flow rate, pressure, billing information, etc.), geographical location of a meter associated with the utility data, a customer associated with the utility data, a range of values of the utility data, demographic data of an area (e.g., a high crime area, poverty area, behavioral data of an area, etc.), geography characteristics (e.g., high heat geographic areas, rapid growth areas, construction areas, high heat and rapid growth areas, older/antiquated utility system areas, high impact change areas (e.g., environmental events, downstream effects from construction, accidents, etc.), or other characteristics. The previously used utility visualizations may be filtered or examined to identify the candidate utility visualizations. The candidate utility visualizations may be ranked. The ranking of the candidate utility visualizations may be based on user feedback rating candidate utility visualizations and/or use patterns of previously used utility visualizations. The user feedback may include tags assigned to previously used utility visualizations. The use patterns may include frequency of use of previously used utility visualizations, context of use of previously used utility visualizations, pattern of use of previously used utility visualizations, and/or demographics of use of previously used utility visualizations. The ranked candidate utility visualizations may be provided to an operator. The ranked candidate utility visualizations may provide context of previous visualization patterns to operators. For example, the ranked candidate utility visualizations may provide context to operators as to how other operators discovered patterns (e.g., other operator's steps in visualizations, other operator's order of visualizations, etc.) in previous visualizations. An operator may select a utility visualization from the ranked candidate utility visualizations based on the context and goals of the operator. The selected utility visualization may be displayed in a utility meter data dashboard. The displayed utility visualization may be used to discover a utility event and/or initiate action through operation of automated systems.

The discussion herein includes several sections. Each section is intended to be an example of techniques and/or structures, but is not intended to indicate elements which must be used and/or performed. A section entitled "Example System and Techniques" discusses example structures and implementations that scan and filter measurement data, exception data and event data. Additionally, the example structures perform pattern-matching functionality to locate and/or infer utility events and utility visualizations. Further, the example structures perform pattern-matching functionality to locate and/or infer previous utility visualizations as intelligent context tooling. A section entitled "Example User Interface" discusses example output of contextualized utility meter data from a utility infrastructure. A section entitled "Example Methods" discusses aspects of methods operational in devices including processors, memory devices, application specific integrated circuits (ASICs), etc. In particular, the example methods may be applied to any of the techniques discussed herein, including those of the following sections.

Example System and Techniques

FIG. 1 illustrates a block diagram showing an example utility system 100 from which utility data may be obtained along with an example utility meter data dashboard 102 configured as part of a central office 104 according to an embodiment in this disclosure. The utility meter data dashboard 102 and/or the central office 104 may be configured for performing techniques of contextualization of utility data obtained from the utility system 100 according to an embodiment in this disclosure. The central office 104 may communicate over a network 106, such as the Internet, with one or more nodes 108(1), 108(2), 108(3), 108(4), 108(5), 108(6), 108(7), 108(8), 108(9), 108(N) in one or more networks 110(1) and 110(N) associated with the utility system 100. The central office 104 may receive data from, and transmit data to, the nodes 108(1)-108(N) of the one or more networks 110(1) and 110(N). In one example, a derivation and/or inference process may be used with the data, to identify one or more utility events or other desired information. In another example, data received from the utility network may be filtered (e.g., by the use of patterns or templates) to infer or derive at least one measurement, exception or event. The filtration, derivation and/or inference process may be applied to vast quantities of data. The filtered data items may fit, and/or be consistent with, patterns of measurements, exceptions and/or events that indicate a utility event.

The utility system 100 may include electric, gas, water, sewer, steam or other utility systems. The elements of the utility system may be configured as a network(s), according to any desired strategy or architecture. The one or more networks 110(1) and 110(N) may include a mesh network (e.g., network 110(1)) and a star network (e.g., network 110(N)), which are but two network architectures according to which the utility system 100 may be configured.

The mesh network includes a plurality of nodes (e.g., nodes 108(1)-108(5)), which represents any number of nodes. The nodes may be associated with meters, transformers, switches, substations, any supervisory control and data acquisition (SCADA) device, etc., and more generally with any circuit and/or system element with which one- or two-way communication is desired. Within the mesh network, the nodes communicate with each other to relay information in a downstream direction and/or an upstream direction. Accordingly, the central office 104 may establish and conduct communication with the nodes, and may receive data from one or more of the nodes suitable for filtering and processing for utility events.

Within the star network, a central node (e.g., node 108(6)) communicates with one or more downstream nodes, represented by nodes 108(7)-108(N). The star network may include downstream flows of information and/or upstream flows of information. Accordingly, the central office 104 may establish and conduct communication with the nodes, and may receive data from one or more of the nodes suitable for filtering and processing for utility events.

FIG. 1 illustrates the utility meter data dashboard 102, which includes a first utility visualization 112 of a first type of chart 114. While FIG. 1 illustrates the first utility visualization 112 of the first type of chart 114 being a first utility visualization of a line chart, the first utility visualization 112 of the first type of chart 114 may be any one of a plurality of utility visualizations of different types of charts. For example, the first utility visualization 112 of the first type of chart 114 may be any one of a visualization of a graph, a bar graph, pie chart, a gauge, a flowchart, a table, a process chart, a flow chart, a map, an overlay map, an overlay chart, a visual sequence (e.g., chart to chart, chart to map, map to chart, chart to table, table to chart, map to map), geospatial data (a combination of a table, chart, and map) etc. As used herein, a visual sequence may be a sequence of position on a page or rendering, a temporal sequence (e.g., one visualization is presented and then a second visualization is presented in sequence), or a combination of these. In some examples, a visual sequence may be implemented by presenting a first visualization of the sequence initially and then presenting a second visualization in the sequence in response to a user input (e.g., hovering a cursor over or in proximity to the first visualization, clicking or otherwise selecting the first visualization or other location on a screen or dashboard, etc.). Maps may include location data, satellite/image data, utility distribution network topology data, communication network topology, combinations of these and/or other data. The first utility visualization 112 of the first type of chart 114 may represent utility data. For example, here in this embodiment illustrated in FIG. 1, the first utility visualization 112 of the first type of chart 114 represents read rate utility data (e.g., a frequency at which the meter data is stored and/or reported to a utility company). The utility meter data dashboard 102 may be associated with a type of utility event 116 that may be a problem of interest to an operator based on the operator's perspective and goals operating the utility meter data dashboard 102. For example, here in this embodiment illustrated in FIG. 1, the type of utility event 116 represents a drop in read rates where part of a 7 day trend shows an inflection of read rates going down, which may be a problem of interest to an operator of the utility meter data dashboard 102. The utility meter data dashboard 102 may include a dashboard area 118 configured to display contextualized utility data information. For example, the dashboard area 118 may be a dashboard area configured to receive a subset of the utility data selected (e.g., dragged and/or dropped) from the first utility visualization 112 and display the selected subset of the utility data along with contextualized utility data information. Thus, an operator of the utility meter data dashboard 102 may visualize the utility data in the dashboard area 118 along with the contextualized utility data information to more quickly and more easily discover a utility event based at least in part on context and/or goals as compared to viewing pre-selected charts provided with specified nodes capability (API). For example, an operator of the utility meter data dashboard 102 may more quickly and more easily discover a utility event based at least in part on context and/or goals as compared to viewing a node (e.g., a chart type data visualization point, a map type data visualization point, a table type data visualization point, a picture type data visualization point, an animation type data visualization point, etc.) that can be populated by an API call, for example.

Figure 2:
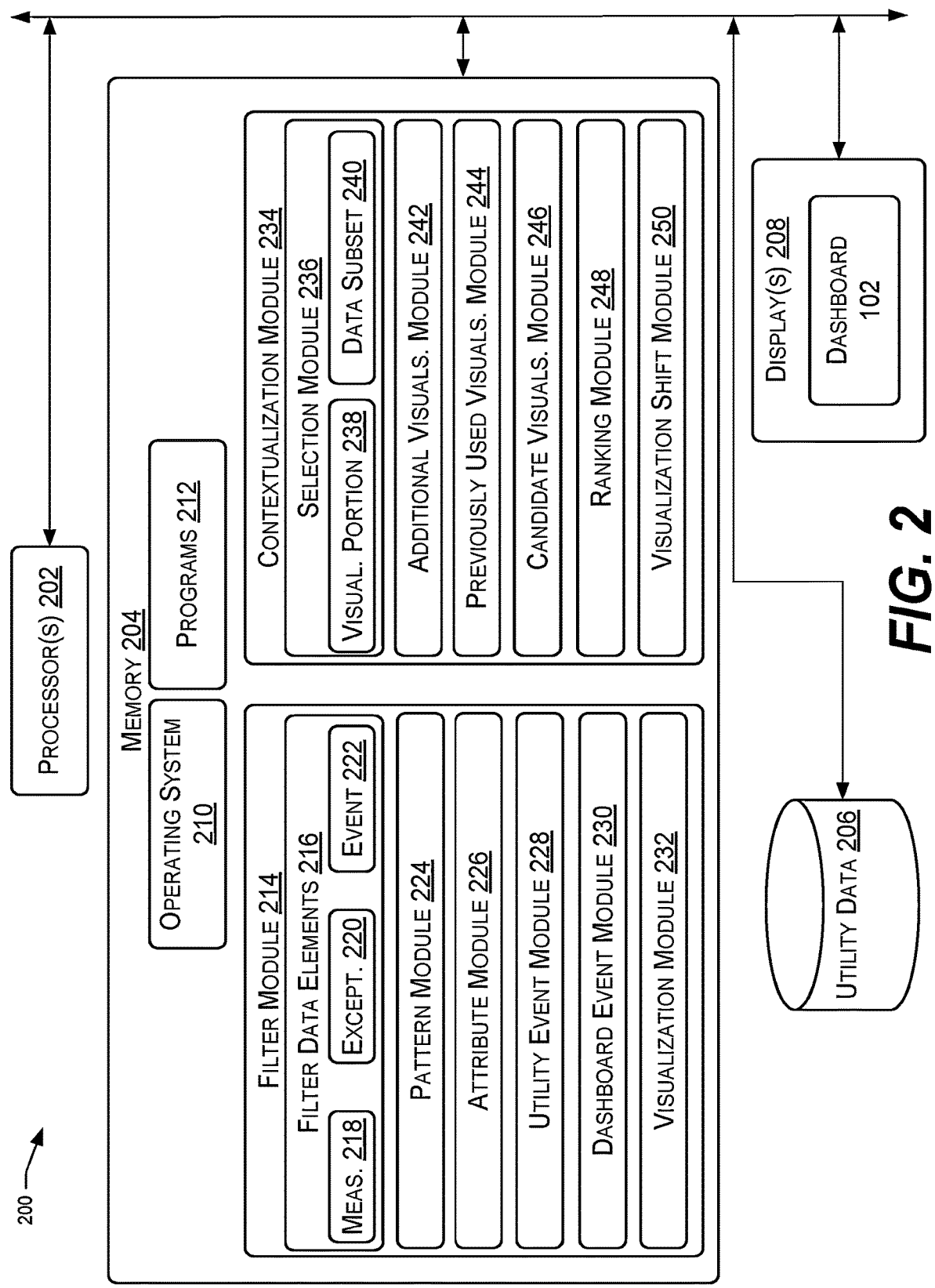
FIG. 2 illustrates a block diagram showing an example computing device, such as a central office server of FIG. 1, for analyzing, contextualizing, and visualizing the utility data according to an embodiment in this disclosure.

FIG. 2 is a block diagram showing example structure of a utility system 200 configured for performing techniques of contextualization of previous visualizations in the utility system 100 according to an embodiment in this disclosure. The utility system 200 is representative of systems that may be operated by the central office 104 of FIG. 1 or other location, as desired. The utility system 200 may include one or more processors 202 and memory 204. In the example shown, utility data 206 may be obtained from the plurality of nodes 108(1)-108(N) of FIG. 1 and/or a plurality of network devices, and may be stored on a high-capacity device. A display 208 may include a view screen or other input/output device which may display the utility meter data dashboard 102 of FIG. 1 to an operator or other user.

The memory 204 may include an operating system 210 and one or more programs 212. One or more of the program(s) 212 may be configured for utility data analysis and/or contextualizing utility data in the utility system 100 of FIG. 1. The programs may be centrally located at a central office or back office, or may be distributed over a network with portions of code executed at a plurality of locations. Such programs may receive, filter and/or interpret data from the nodes 108(1)-108(N) of the one or more networks 110(1) and 110(N) of FIG. 1. The data may be filtered, pattern-matched and/or analyzed to derive or infer at least one measurement, exception, event, and/or sequences of events. The filtered data items may be examined for fit and/or consistency with patterns of measurements, exceptions, events and/or attributes that indicate a utility event. Such utility events may have value to an operator or the system generally, in that they may indicate issues of utility functionality—such as power quality, theft, device failure, and/or other concerns. The filtered data items (e.g., data events) and/or sequences of events may be examined to identify candidate utility visualizations that provide context of previous visualization patterns used to discover the utility events. For example, the filtered data items and/or sequences of events may be examined to identify candidate utility visualizations that provide increasing context through relationships including previous patterns that promote discovery of more relationships. Such context of previous visualization patterns may have value to an operator or the system generally, in that the context may shorten paths to discovery of utility events.

A filter module 214 may filter the utility data 206 to locate one or more data elements 216 that may be relevant with respect to the identification of one or more utility events. In the example shown, the filter module 214 may filter and/or identify relevant or filtered data elements 216 from among potentially vast quantities of the raw utility data 206. In the example, the filtered data elements 216 may include consumption, voltage, transformer and/or other system measurements 218, system and/or network exceptions 220, and/or events 222. The measurements 218, exceptions 220 and/or events 222 may include electrical, water, gas or other utility measurements. Thus, in the example of FIG. 2, the filter module 214 filters the utility data 206 for data elements 216, which may include measurements 218, exceptions 220, and/or events 222.

The filter module 214 may compare the data elements 216 to one or more patterns within a pattern module 224. Accordingly, the utility data 206 may be filtered by comparison to known patterns of measurements, exceptions, events and/or attributes that indicate a utility event. In one example, the pattern module 224 may include one or more patterns associated with one or more utility events. Thus, one or more patterns may be compared to filtered data elements 216 to identify and/or infer existence of one or more utility events. The particular measurements 218, exceptions 220, and/or events 222 identified by any particular filter may be considered to be "building blocks" which indicate and/or infer the existence of a particular utility event.

In one example of the utility system 200, the pattern module 224 may be enhanced by the addition of new patterns that identify utility events. For example, if system operators become aware of an additional utility event of concern, a pattern of measurements, exceptions and/or events that indicate the utility event may be defined by a pattern, which may be added to the pattern module 224.

The filter module 214 may also consider one or more attributes from an attribute module 226. Attributes may include information that is beyond the scope of the data collected from meters, transformers, switches, substations, valves, etc., of the utility system and/or network. Accordingly, attributes may include information such as demographic information about specific consumers and/or aggregated demographic information about consumers in an area or neighborhood. Attributes may include almost any useful information, such as the nature of the consumer (restaurant, house, etc.), the nature and consumption habits of such consumers, the time of day, the date and the year. Attributes may include information about weather, climate and economy, customer history, prior events at the location, etc. The attributes may also include information obtained from the utility system or network, such as information associated with events. Examples of such attributes include duration of an outage event, magnitude of a voltage spike event, value of a low voltage event or measurement, etc. In a further example of attributes and utility events, attributes may indicate increased use on one or more transformers and a related (demographic) attribute indicating increase in use of plug-in electric cars. A utility event may be recognized based on association of these attributes with recognized data elements, defined patterns and/or previously recognized utility events. In operation, the filter module 214 may match and/or consider the filtered data elements 216 together with any of a number of the one or more attributes from the attribute module 226 in operations that derive, infer and/or detect one or more utility events. In a specific example, an attribute indicating that a business is closed on the weekends may be considered when determining if low measured consumption data over the weekend is an exception or a normal measured value. In another specific example, a service call attribute may indicate that utility service personnel were on site during the event and therefore the event should be given higher or lower priority, depending on context.

In the process of recognizing utility events, the filter module 214 may also consider one or more previously identified utility events, which may be recorded in a utility event module 228. Thus, a "complex" or "compound" utility event may be inferred (e.g., such as by use of a pattern in the pattern module 224) by utilization of one or more previously identified utility events, together with one or more filtered data elements 216 and attributes from attribute module 226. In a specific example, a utility event (comprising a meter removal/replacement event) may be recognized by power down and power up events. Additionally, the meter removal/replacement utility event, together with a period of reduced usage by the consumer may indicate a further utility event (e.g., a meter bypass event). Similarly, a pattern may associate two meter removals with one meter bypass utility event. And in another example, a meter bypass event may include a pattern of two meter bypass utility events and a period of reduced usage between them. Accordingly, a utility event may be used as a building block for a further utility event. This may be continued in a recursive and/or nested manner for any number of utility events.

The filter module 214 may filter data representative of the utility meter data dashboard 102 to determine the type of utility event 116, from among previously identified utility events recorded in the utility event module 228. For example, the filter module 214 may filter data representative of at least a portion of the first utility visualization 112 displayed in the utility meter data dashboard 102 to determine if the type of utility event 116 displayed in the utility meter data dashboard 102 is similar to a previously identified utility event. For example, the filter module 214 may filter data representative of the first utility visualization 112 to determine if the type of utility event 116 is similar to a previously identified utility event such as, for example, a drop and/or increase in a read rate, a drop and/or increase in consumption, a duration of an outage event, a magnitude of a voltage spike event, low voltage event, decrease and/or increase use on transformers, a transformer failure event, a deenergization of a distribution line event, a conservation event, a power-down event, a power-up event, a power outage event, a leak, a leak with specific characteristics, a sonic event (e.g., in a case involving water or gas), a rain event causing flooding (e.g., a rain event that floods a basement with a hot water heater, breaking a gas-line, and possibly another heater higher up with a pilot light) periodic measurements (e.g., consumption over the last hour), alarms (e.g., threshold crossings), unsolicited events (e.g., meter measurement feeds into periodic measurements), demographic events, geospatial events, etc. The filter module 214 may determine derivation event pattern combinations as event types. The derivation events may represent atomic blocks that may be built upon to provide for understanding more complex events. For example, the derivation may be an exception event, where there may be a common event, or a common pattern of events with measures or thresholds that define a common range. An event or events pattern that goes outside of that threshold may be useful as a filter. An event or events patterns that goes outside of that threshold may also be useful as an event definition that can be used individually, or in combination with other events. As event definitions are developed, the event definitions may drive decision making efficiencies. Filtering may occur proximate to the base derivation event, or proximate to a more complex set of events as types of events are identified. Relationships between events become powerful indicators that can be utilized as signatures in the future as filter collections. The determined type of utility event 116 associated with the utility meter data dashboard 102 may be recorded in a dashboard event module 230. This may be continued in a recursive and/or nested manner for any number of utility meter data dashboards.

The filter module 214 may further filter data representative of the utility meter data dashboard 102 to determine the type of chart representing the utility data. For example, the filter module 214 may further filter data representative of the first utility visualization 112 displayed in the utility meter data dashboard 102 to determine if the type of chart 114 is representative of a graph, a bar graph, a pie chart, a gauge, a flowchart, a table, a process chart, a flow chart, a map, an overlay map, an overlay chart, a visual sequence (e.g., chart to chart, chart to map, map to chart, chart to table, table to chart, map to map), geospatial data (a combination of a table, chart, and map) etc. Maps may include location data, satellite/image data, utility distribution network topology data, communication network topology, combinations of these and/or other data. The type of chart 114 of the first utility visualization 112 displayed in the utility meter data dashboard 102 may be recorded in a visualization module 232. This may be continued in a recursive and/or nested manner for any number of utility visualizations displayed in a utility meter data dashboard 102.

A contextualization module 234 may filter data representative of a selected visual portion of the utility meter data dashboard 102 to determine a subset of the utility data associated with the utility meter data dashboard 102. In the example shown, the contextualization module 234 may filter and/or identify data representative of visual portions of the utility meter data dashboard 102 selected via a selection module 236 configured to provide for an operator to select a visual portion of the utility meter data dashboard 102. In the example, the selection module 236 may include a visual portion 238 of the first utility visualization 112 and/or a data subset 240 of the utility data represented by the first utility visualization 112. For example, the selection module 236 may provide for an operator to select the visual portion 238 of the first utility visualization 112 and the contextualization module 234 may filter data representative of the selected visual portion 238 of the first utility visualization 112 to determine the data subset 240 of the utility data represented by the first utility visualization 112. For example, an operator viewing the utility meter data dashboard 102 may find the drop in read rates where part of the 7 day trend shows the inflection of read rates going down, displayed in the first utility visualization 112, to be a problem of interest. Subsequent to the operator visualizing the problem of interest (i.e., in this example, visualizing the drop in read rates), the operator may select the visual portion of the first utility visualization 112 that includes the problem of interest. The contextualization module 234 may receive at least this selected visual portion and determine the data subset 240 of the utility data represented by the visual drop in read rates. Thus, in the example of FIG. 2, the contextualization module 234 filters utility data, selected via the selection module 236, for the selected visual portion 238 and/or the data subset

240. This may be continued in a recursive and/or nested manner for any number of utility visualizations displayed in a utility meter data dashboard 102.

The contextualization module 234 may include an additional visualization module 242 configured to determine a plurality of additional utility visualizations that are associated with the data subset 240. For example, the additional visualization module 242 may determine hundreds of possible utility visualizations that could be displayed for the selected data subset 240. A previously used visualization module 244 may determine, from among the plurality of additional utility visualizations 242, one or more previously used utility visualizations. For example, the previously used visualization module 244 may filter data representative of historical usage data where the one or more previously used utility visualizations were used by one or more operators to view the data subset 240. The one or more previously used utility visualizations having been used by one or more operators to view the subset of the utility data or other utility data having a characteristic in common with the subset of the utility data. The "characteristic in common" can include the category of meter data (e.g., consumption rate, voltage, current, impedance, flow rate, pressure, billing information, etc.), geographical location of a meter associated with the utility data, a customer associated with the utility data, a range of values of the utility data, address data, account data, utility commodity data, shared feeder data, district data, line data, service point data, transformer data, firmware version data, date data, time data, time-zone data, state data, social demographic data, structure size data, zoning data (e.g., commercial zone data, residential zone data, industrial zone data, government zone data), rate of reading data, etc. The characteristic in common may influence visualizations and filter sets such as type, duration, frequency, or more complex patterns of events, as well as user role representing a perspective that adds context to the data.

The contextualization module 234 may include a candidate visualization module 246 configured to determine, from among the one or more previously used utility visualizations, one or more candidate utility visualizations that are associated with the type of utility event. For example, of all of the one or more previously used utility visualizations, some number of the one or more previously used visualizations were viewed because of a problem of interest (e.g., a drop in read rates) and the candidate visualization module 246 may determine, from among the one or more previously used utility visualizations, one or more candidate utility visualizations that are associated with the problem of interest. The one or more candidate utility visualizations that are associated with the type of utility event informing on a value of a visualization and/or information in a culture.

The contextualization module 234 may include a ranking module 248 configured to rank the one or more candidate utility visualizations that are associated with the type of utility event. The ranking module 248 may rank the one or more candidate utility visualizations based at least in part on use patterns and/or discovery relationships. The use patters may include a frequency of use of the one or more previously used utility visualizations that are associated with the type of utility event. For example, the use patterns may include a frequency of use of how often is a type of chart (e.g., first type of chart 114) used to visualize the type of utility event. The use patterns may further include a context of use of the one or more previously used utility visualizations that are associated with the type of utility event. For example, the use patterns may include a context of use of a pattern of use of a visualization (e.g., a type of chart) that is typically used in a billing revenue assurance report, theft detection report, or other report) and/or an order of presenting charts (e.g., a plurality of charts used in sequence with high success). The use patterns may further include a pattern of use of the one or more previously used utility visualizations that are associated with the type of utility event. For example, the use patterns may include a pattern of use of a plurality of previously used visualizations (e.g., previously used visualization 1, previously used visualization 2, previously used visualization 3, previously used visualization 4, etc.) where one particular previously used visualization (e.g., previously used visualization 3) was used first, followed by another particular previously used visualization (e.g., previously used visualization 1), followed by another particular previously used visualization (e.g., previously used visualization 2), followed by another particular previously used visualization (e.g., previously used visualization 4), etc. Further, operators may be monitored to determine patterns of use of what operators are doing to discover utility events and how frequently are the operators discovering utility events. The use patterns may further include a demographics of use of a particular population base associated with utility meters. For example, the use patterns may include a demographics of use of a particular population base (e.g., a population base more frequently being associated with fraud) associated with utility meters.

The ranking module 248 may rank the one or more candidate utility visualizations based at least in part on user feedback rating the one or more candidate utility visualizations. The user feedback may include tags assigned to the one or more previously used utility visualizations. The tags may indicate at least one of: the type of utility event to which respective ones of the one or more previously used utility visualizations relate; a type question that respective ones of the one or more previously used utility visualizations relate were used to answer; or a role of a user that used respective ones of the one or more previously used utility visualizations. The tags may further indicate at least one of: the one or more previously used utility visualizations having been previously successful in discovery of the type of utility event; or a series of visualizations of the one or more previously used utility visualizations as being successful in discovery of the type of utility event. The tags add context to visualizations and may be generated based at least in part on a culture and/or business language and/or need. For example, businesses may have specific ways of work, needs, and/or unique language and/or tools that may be expressed via tags. For example, a tag may be generated that expresses an intermittent meter signal outside of accepted range in a high crime area with a history of energy theft. In this example, the generated tag may be expressed with a company specific label, a set of range thresholds, a specific set of combined visuals (e.g., tables, charts, maps, etc.). A tag may be a single named reference containing items (e.g., company specific label, a set of range thresholds, a specific set of combined visuals, etc.) as an internal intellectual property value.

The contextualization module 234 may cause presentation of one or more user comments describing context for previous use of the one or more candidate utility visualizations. Operators may tag and provide comments through the visualization. For example, operators may tag existing workspace with descriptive tags (e.g., tag visualization in existing workspace as being for revenue assurance and why the visualization in the existing workspace is useful).

The contextualization module 234 may cause display, based at least in part on the ranking, of a ranked list of the one or more candidate utility visualizations. For example, the contextualization module 234 may generate a ranked list of the one or more candidate utility visualizations having a sequence of candidate utility visualizations starting with the highest ranked candidate utility visualization and ending with the lowest ranked candidate utility visualization. Thus, the contextualization module 234 may rank the one or more candidate utility visualizations based at least in part on use pattern, discovery relationships, and/or user feedback and generate a ranked list of the one or more candidate utility visualizations with the highest ranking candidate utility visualization positioned at the top of the ranked list of the one or more candidate utility visualizations. Thus, an operator may select a second utility visualization from among the ranked list of the one or more candidate utility visualizations based on contextual data model information showing the data in the highest rated manner given the discovery path and information recorded by other operators. For example, the sequence of the ranked list of the one or more candidate visualizations may start with a chart, then process, then table. Single visualizations without a visual path to discovery may be rated lower.

The ranked list of the one or more candidate utility visualizations providing view options to shift view from the subset of the utility data, being displayed in the dashboard area 118 and selected from the first utility visualization 112, to a second utility visualization while noting path options and ratings. The addition of this visual data to the utility meter data dashboard 102 provides operators with visual exploration and/or visualization discovery options for view selection, view frequency, view common use patterns, frequency, rating, and additional contextual information that shortens paths to discovery of utility events.

The contextualization module 234 may include a visualization shift module 250. The visualization shift module 250 may provide for changing views of the utility data based at least in part on a selection of a candidate utility visualization listed in the ranked list of the one or more candidate utility visualizations. For example, the visualization shift module 250 may provide for changing from displaying the subset of the utility data, being displayed in the dashboard area 118 and selected from the first utility visualization 112, to a second utility visualization showing detail parameters in a view type associated with the selected candidate utility visualization selected from the ranked list.

Example User Interfaces

Figure 3:
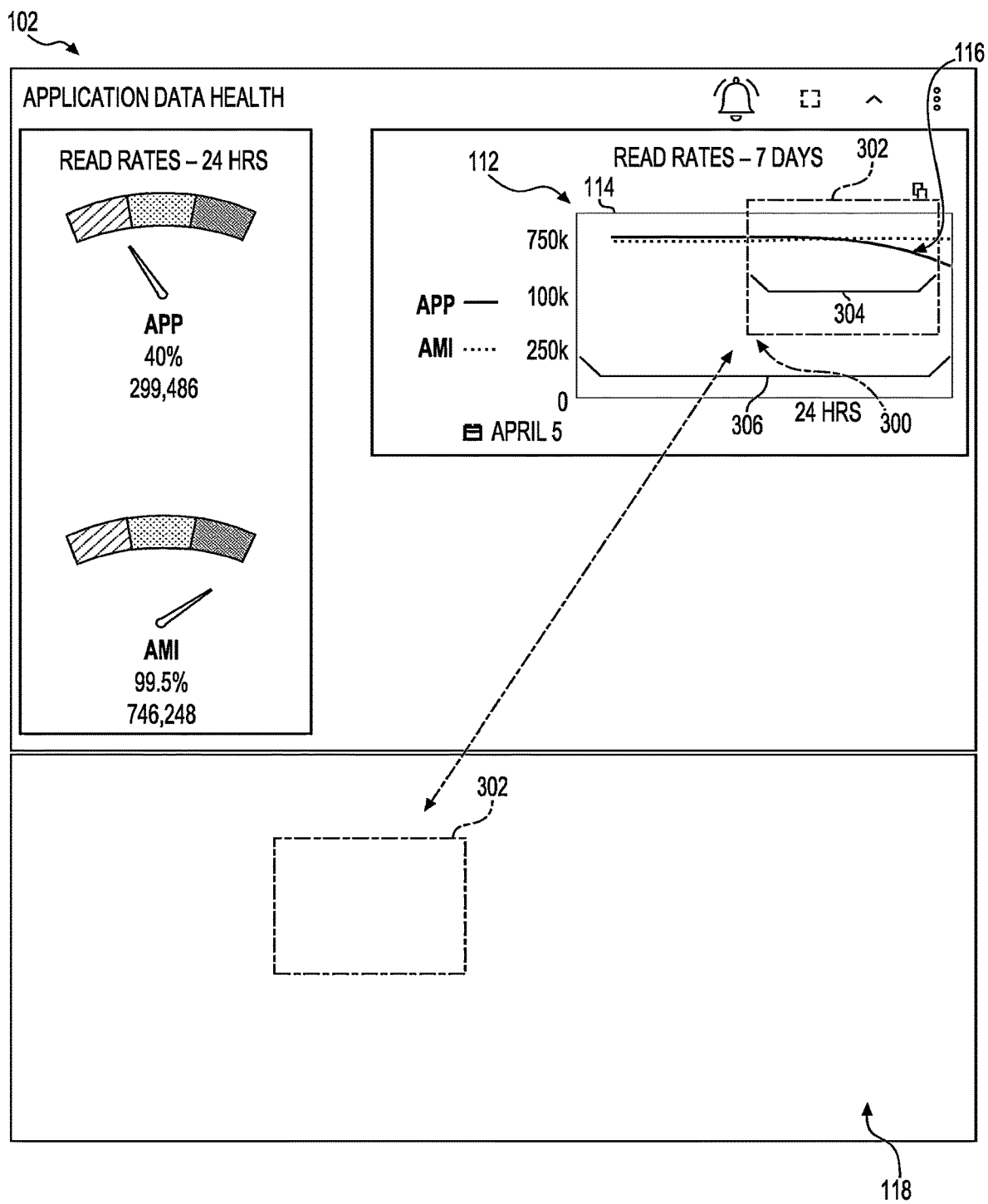
FIG. 3 illustrates an example selection of a portion of a first utility visualization being displayed in the utility meter data dashboard of FIG. 1 according to an embodiment in this disclosure.

FIG. 3 illustrates an example user selection 300 of a visual portion 302 of the first utility visualization 112 being displayed in the utility meter data dashboard 102 of FIG. 1 according to an embodiment in this disclosure. The user selection 300 may be a gesture interaction (e.g., pointing device gesture, a mouse gesture, a finger gesture, etc.). As discussed above, the selection module 236 may provide for the user selection 300 of the visual portion 302 of the first utility visualization 112. The user selection 300 of the visual portion 302 defining a data subset 304 of utility data 306 represented by the first utility visualization 112.

In the example shown, the user selection 300 includes a drag-and-drop type user selection. For example, an operator may select the visual portion 302 of the first utility visualization 112, including the type of utility event 116 that may be a problem of interest to the operator, and drag-and-drop the selected visual portion 302 into the dashboard area 118. While FIG. 3 illustrates the user selection 300 may be a drag-and-drop type user selection, the user selection may be other types of user selections. For example, the user selection may be a highlight selection, an audible selection, a point-and-click selection, etc.

Figure 4:
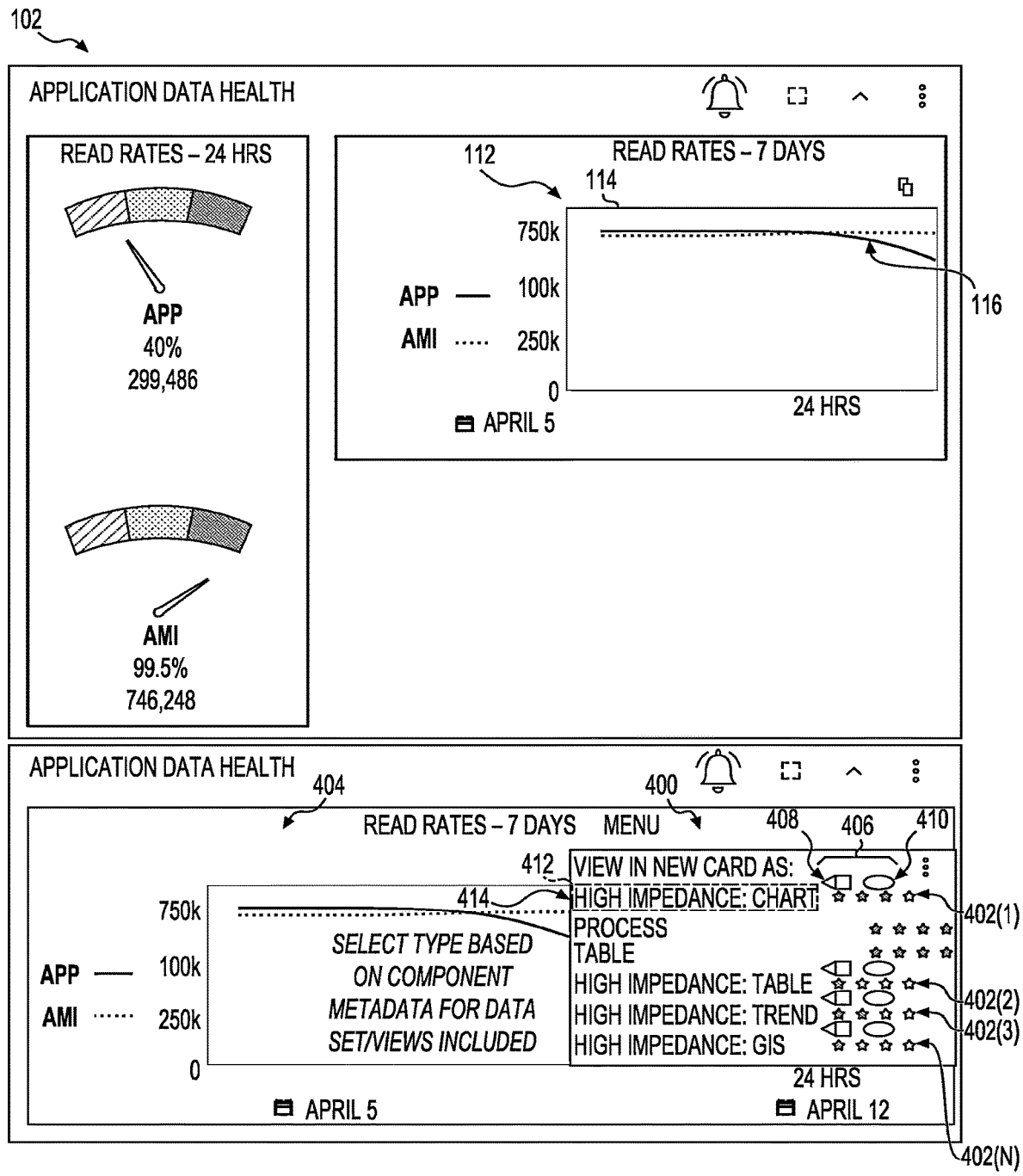
FIG. 4 illustrates an example ranked list of one or more candidate utility visualizations being displayed in the utility meter data dashboard of FIG. 1 according to an embodiment in this disclosure.

FIG. 4 illustrates an example ranked list 400 of one or more candidate utility visualizations 402(1), 402(2), 402(3), and 402(N) being displayed in the utility meter data dashboard 102 of FIG. 1 according to an embodiment in this disclosure. In the example shown, the selected visual portion 302 has been dropped into the dashboard area 118 where the data subset 304 from the selected portion 302 is used to create a visualization 404 that includes the ranked list 400. As discussed above, the contextualization module 234 may determine the data subset 304 from the selected portion 302 and may generate the ranked list 400. In the example, the ranked list 400 of the one or more candidate utility visualizations 402(1)-402(N) may have a sequence starting with the highest ranked candidate utility visualization 402(1) and ending with the lowest ranked candidate utility visualization 402(N). The ranked list 400 may provide view options, to shift view, noting path options and ratings. For example, the highest ranked candidate utility visualization 402(1) provides an option to shift view to a high impedance chart including a process and a table, the next lower ranked candidate utility visualization 402(2) provides option to shift view to a high impedance table, the next lower ranked candidate utility visualization 402(3) provides option to shift view to a high impedance trend, and the next lower ranked candidate utility visualization 402(N) provides option to shift view to a high impedance geographical information system (GIS) map. Because the ranked list 400 provides view options, to shift views, noting path options and ratings operators can shorten paths to discoveries of utility events.

The visualization 404 may further include user feedback 406 rating the one or more candidate utility visualizations 402(1)-402(n). The user feedback 406 may include tags 408 and/or one or more user comments 410. As discussed above, the tags 408 may indicate at least one of: the type of utility event to which respective ones of the one or more previously used utility visualizations relate; a type question that respective ones of the one or more previously used utility visualizations relate were used to answer; a role of a user that used respective ones of the one or more previously used utility visualizations; the one or more previously used utility visualizations having been previously successful in discovery of the type of utility event; or a series of visualizations of the one or more previously used utility visualizations as being successful in discovery of the type of utility event. Also as discussed above, the one or more user comments 410 may describe context for previous use of the one or more candidate utility visualizations.

FIG. 4 further illustrates a selection 412 of at least a second utility visualization 414, from among the ranked list 400 of the one or more candidate utility visualizations 402(1)-402(N). In the example shown, the selection 412 of the second utility visualization 414 may be based at least in part on an operator's context and goals to have the highest ranked candidate utility visualization 402(1) shifted in view from the visualization 404 displaying the data subset 304 as a line chart of read rates to displaying a high impedance chart including a process and a table (discussed in more detail below with regards to FIGS. 5A and 5B).

Figure 5A:
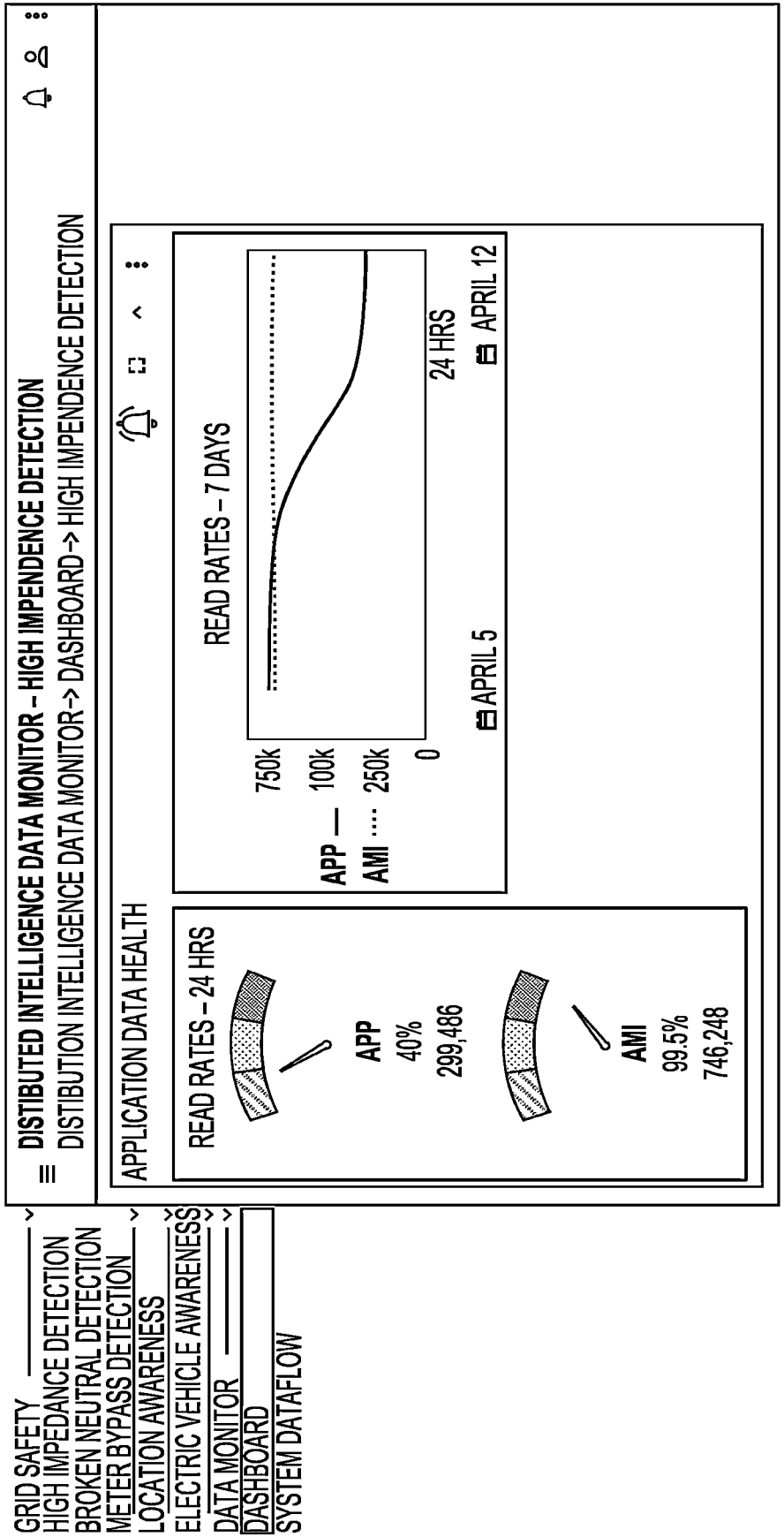
FIGS. 5A and 5B illustrate an example second utility visualization being displayed in the utility meter data dashboard of FIG. 1 according to an embodiment in this disclosure.
Figure 5B:
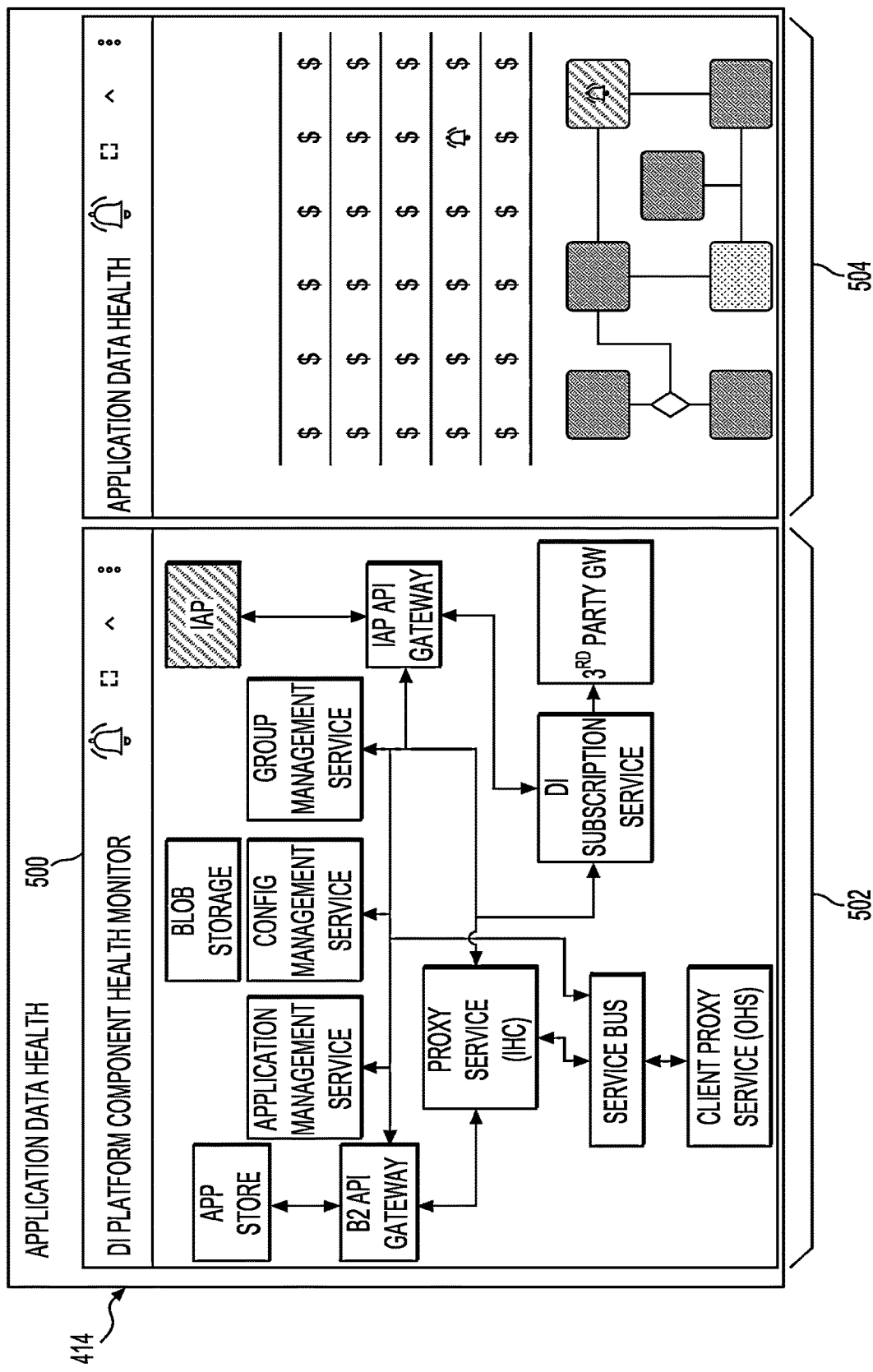

FIGS. 5A and 5B illustrate the second utility visualization 414 being displayed in the utility meter data dashboard 102 of FIG. 1 according to an embodiment in this disclosure. In the example shown, the displaying of the second utility visualization 414 in the utility meter data dashboard 102 is based at least in part on the selection 412 of the second utility visualization 414. FIGS. 5A and 5B illustrate the view change from the visualization 404 created from the dropped data subset 304 to the second utility visualization 414 displayed in the utility meter data dashboard 102. In the example shown, the second utility visualization 414 shows parameters in view types according to the highest ranked candidate utility visualization 402(1) that was selected 412 based on the operator's context and goals. For example, the second utility visualization 414 shows parameters in a chart 500 including a process 502 view type and a table 504 view type according to the highest ranked candidate utility visualization 402(1) that was selected 412 based on the operator's context and goals. As another example, the second utility visualization 414 may show parameters in a trend view type according to another different ranked candidate utility visualization (e.g., lower ranked candidate utility visualization 402(3)) that may have been selected based on an operator's context and goals. An operator may continue to drill into the chart 500 to a final save state. The contextualization module 234 may develop additional visual/data discovery paths based at least in part on the final save state to better illustrate data relationships.

Example Methods

In some examples of the techniques discussed herein, the methods of operation may be performed by software defined on memory and/or application specific integrated circuits (ASIC). The memory 204 may comprise computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

Figure 6:
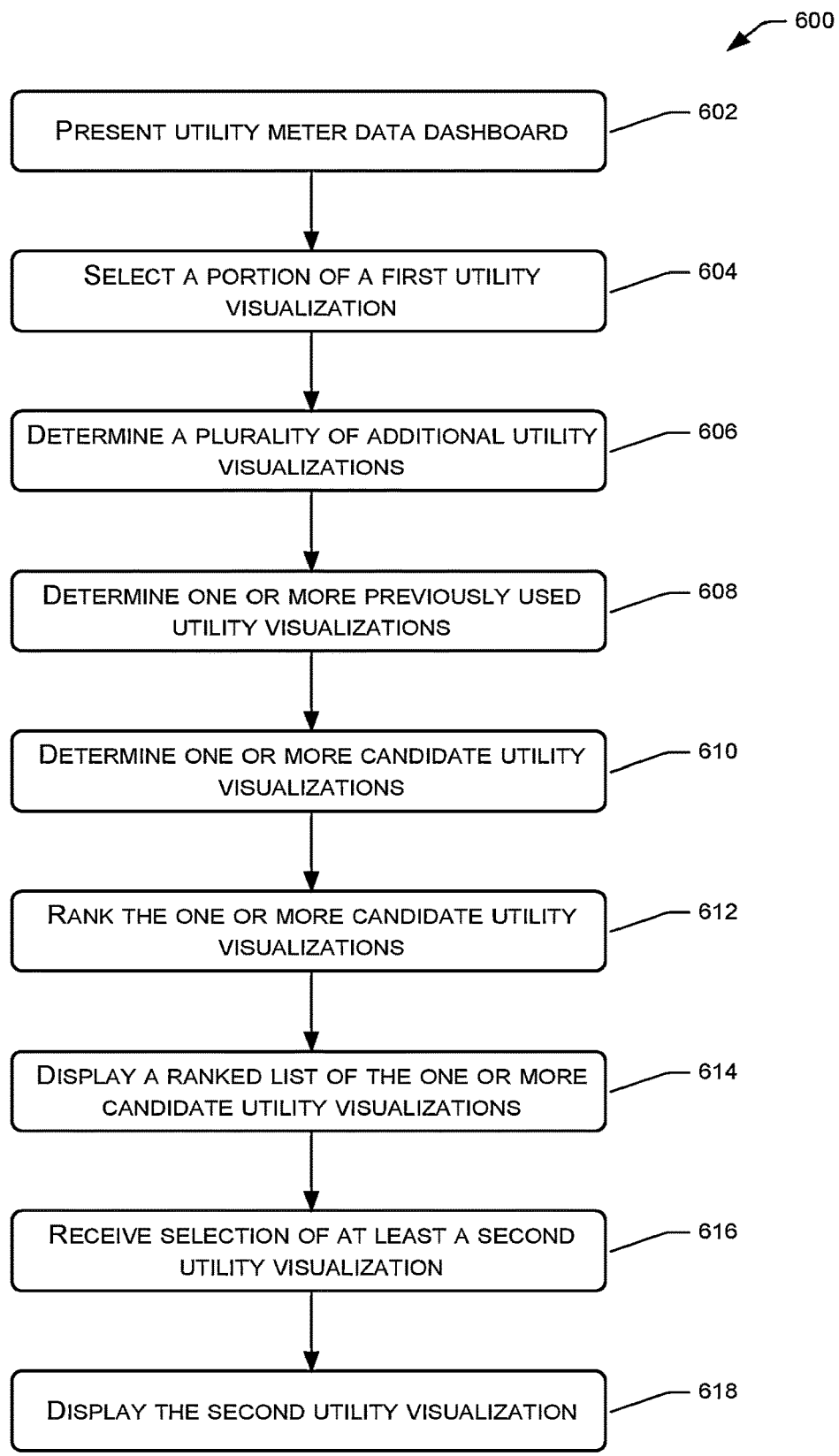
FIG. 6 is a flow diagram showing example method for contextualizing utility visualization patterns in the utility infrastructure environment of FIG. 1 according to an embodiment in this disclosure.

FIG. 6 is a flow diagram showing an example method 600 for contextualizing utility visualization patterns in a utility infrastructure environment (e.g., utility system 100). In one example, data may be filtered to obtain measurements, exceptions, and events. Attributes and patterns may be used to identify one or more utility events. Once identified, utility events may be prioritized and reported to an operator or utility system through operation of a user interface, automated notification system, or automated utility system that may take action without human intervention. Examples of utility events include a fraud event, a fault event, or a false positive meter event. Previous utility visualization patterns may be utilized to provide contextualization to operators of these systems.

At operation 602, a utility system (e.g., utility system 200) may cause presentation of a utility meter data dashboard (e.g., utility meter data dashboard 102) associated with a type of utility event (e.g., a type of utility event 116). The utility meter data dashboard may include a first utility visualization (e.g., first utility visualization 112) of a first type of chart (e.g., first type of chart 114) representing utility data (e.g., utility data 306).

At operation 604, the utility system may receive a selection (e.g., selection 300) of a visual portion (e.g., visual portion 302) of the first utility visualization. The portion may be associated with a data subset (e.g., data subset 304) of the utility data. In the context of the example of FIG. 3, an operator may select the visual portion of the first utility visualization because the type of utility event is a problem of interest to the operator.

At operation 606, the utility system may determine, based at least in part on the selection, a plurality of additional utility visualizations that are associated with the subset of the utility data.

At operation 608, the utility system may determine, from among the plurality of additional utility visualizations, one or more previously used utility visualizations. In the context of the example of FIG. 2, the one or more previously used utility visualizations were used by one or more users to view the subset of the utility data or other utility data having a characteristic in common with the subset of the utility data.

At operation 610, the utility system may determine, from among the one or more previously used utility visualizations, one or more candidate utility visualizations (e.g., one or more candidate utility visualizations 402(1)-402(N)) that are associated with the type of utility event. In the context of the example of FIG. 2, some quantity of the one or more previously used utility visualizations were viewed by operators because of a problem of interest to the operators, and the candidate visualization module may determine, from among the one or more previously used utility visualizations, one or more candidate utility visualizations that are associated with the problem of interest.

At operation 612, the utility system may rank the one or more candidate utility visualizations that are associated with the type of utility event. In the context of the example of FIG. 2, the ranking may be based at least in part on use patterns (e.g., a frequency of use, a context of use, a pattern of use, or a demographics of use) and/or user feedback (e.g., tags and/or user comments).

At operation 614, the utility system may cause display, based at least in part on the ranking, of a ranked list (e.g., ranked list 400) of the one or more candidate utility visualizations. In the context of the examples of FIGS. 2 and 4, the ranked list may provide view options, to shift view, noting path options and ratings. The ranked list may be listed in sequence starting with a highest ranked candidate utility visualization (e.g., highest ranked candidate utility visualization 402(1)) and ending with a lowest ranked candidate utility visualization (e.g., lowest ranked candidate utility visualization 402(N)).

At operation 616, the utility system may receive a selection (e.g., selection 412) of at least a second utility visualization (e.g., second utility visualization 414), from among the ranked list of candidate utility visualizations.

At operation 618, based at least in part on the selection, the utility system may cause display of the second utility visualization in the utility meter data dashboard.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:

causing presentation of a utility meter data dashboard associated with a type of utility event, the utility meter data dashboard including a first utility visualization of a first type of chart representing utility data;

receiving a selection of a portion of the first utility visualization, the portion being associated with a subset of the utility data;

determining, based at least in part on the selection, a plurality of additional utility visualizations associated with the subset of the utility data;

determining, from among the plurality of additional utility visualizations, one or more previously used utility visualizations;

determining, from among the one or more previously used utility visualizations, one or more candidate utility visualizations that are associated with the type of utility event;

ranking the one or more candidate utility visualizations that are associated with the type of utility event;

displaying, based at least in part on the ranking, a ranked list of the one or more candidate utility visualizations;

receiving a selection of at least a second utility visualization, from among the ranked list of the one or more candidate utility visualizations; and displaying in the utility meter data dashboard, based at least in part on the selection, the second utility visualization.

2. The method of claim 1, wherein the ranking is based at least in part on user feedback rating the one or more candidate utility visualizations.

3. The method of claim 2, wherein the user feedback includes tags assigned to the one or more previously used utility visualizations, the tags indicating at least one of:

the type of utility event to which respective ones of the one or more previously used utility visualizations relate;

a type question that respective ones of the one or more previously used utility visualizations relate were used to answer; or a role of a user that used respective ones of the one or more previously used utility visualizations.

4. The method of claim 3, wherein the tags further indicate at least one of:

the one or more previously used utility visualizations having been previously successful in discovery of the type of utility event; or a series of visualizations of the one or more previously used utility visualizations as being successful in discovery of the type of utility event.

5. The method of claim 1, further comprising causing presentation of one or more user comments describing context for previous use of the one or more candidate utility visualizations.

6. The method of claim 1, wherein the ranking is based at least in part on use patterns, the use patterns including:

a frequency of use of the one or more previously used utility visualizations that are associated with the type of utility event;

a context of use of the one or more previously used utility visualizations that are associated with the type of utility event;

a pattern of use of the one or more previously used utility visualizations that are associated with the type of utility event; or a demographics of use of a particular population base associated with utility meters.

7. The method of claim 1, wherein the type of utility event comprises one or more of a fraud event, a fault event, or a false positive meter event.

8. The method of claim 1, wherein the one or more previously used utility visualizations were used by one or more users to view the subset of the utility data or other utility data having a characteristic in common with the subset of the utility data.

9. A system, comprising:

one or more processors; and one or more non-transitory computer-readable media storing computer-executable instructions that, when executed on the one or more processors, cause the one or more processors to perform actions comprising:

causing presentation of a utility meter data dashboard associated with a type of utility event, the utility meter data dashboard including a first utility visualization of a first type of chart representing utility data;

receiving a selection of a portion of the first utility visualization, the portion being associated with a subset of the utility data;

determining, based at least in part on the selection, a plurality of additional utility visualizations associated with the subset of the utility data;

determining, from among the plurality of additional utility visualizations, one or more previously used utility visualizations;

determining, from among the one or more previously used utility visualizations, one or more candidate utility visualizations that are associated with the type of utility event;

ranking the one or more candidate utility visualizations that are associated with the type of utility event;

displaying, based at least in part on the ranking, a ranked list of the one or more candidate utility visualizations;

receiving a selection of at least a second utility visualization, from among the ranked list of the one or more candidate utility visualizations; and displaying, based at least in part on the selection, the second utility visualization.

10. The system of claim 9, wherein the ranking is based at least in part on user feedback rating the one or more candidate utility visualizations.

11. The system of claim 10, wherein the user feedback includes tags assigned to the one or more previously used utility visualizations, the tags indicating at least one of:

the type of utility event to which respective ones of the one or more previously used utility visualizations relate;

a type question that respective ones of the one or more previously used utility visualizations relate were used to answer; or a role of a user that used respective ones of the one or more previously used utility visualizations.

12. The system of claim 11, wherein the tags further indicate at least one of:
- the one or more previously used utility visualizations having been previously successful in discovery of the type of utility event; or
- a series of visualizations of the one or more previously used utility visualizations as being successful in discovery of the type of utility event.

13. The system of claim 9, the actions further comprising:
causing presentation of one or more user comments describing context for previous use of the one or more candidate utility visualizations.

14. The system of claim 9, wherein the ranking is base at least in part on use patterns, the use patterns including:
- a frequency of use of the one or more previously used utility visualizations that are associated with the type of utility event;
- a context of use of the one or more previously used utility visualizations that are associated with the type of utility event;
- a pattern of use of the one or more previously used utility visualizations that are associated with the type of utility event; or
- a demographics of use of a particular population base associated with utility meters.

15. A method comprising:
- receiving a selection of a portion of a first utility visualization of a type of chart representing utility data, the portion being associated with a subset of the utility data;
- determining, based at least in part on the selection, a plurality of additional utility visualizations associated with the subset of the utility data;
- determining, from among the plurality of additional utility visualizations, one or more previously used utility visualizations;
- determining, from among the one or more previously used utility visualizations, one or more candidate utility visualizations that are associated with a type of utility event;
- ranking the one or more candidate utility visualizations that are associated with the type of utility event;
- displaying, based at least in part on the ranking, a ranked list of the one or more candidate utility visualizations;
- receiving a selection of at least a second utility visualization, from among the ranked list of the one or more candidate utility visualizations; and
- displaying, based at least in part on the selection, the second utility visualization.

16. The method of claim 15, wherein the ranking is based at least in part on user feedback rating the one or more candidate utility visualizations.

17. The method of claim 16, wherein the user feedback includes tags assigned to the one or more previously used utility visualizations, the tags indicating at least one of:
- the type of utility event to which respective ones of the one or more previously used utility visualizations relate;
- a type question that respective ones of the one or more previously used utility visualizations relate were used to answer; or
- a role of a user that used respective ones of the one or more previously used utility visualizations.

18. The method of claim 17, wherein the tags further indicate at least one of:
- the one or more previously used utility visualizations having been previously successful in discovery of the type of utility event; or
- a series of visualizations of the one or more previously used utility visualizations as being successful in discovery of the type of utility event.

19. The method of claim 15, wherein the ranking is base at least in part on use patterns, the use patterns including:
- a frequency of use of the one or more previously used utility visualizations that are associated with the type of utility event;
- a context of use of the one or more previously used utility visualizations that are associated with the type of utility event;
- a pattern of use of the one or more previously used utility visualizations that are associated with the type of utility event; or
- a demographics of use of a particular population base associated with utility meters.

20. The method of claim 15, wherein the type of utility event comprises one or more of a fraud event, a fault event, or a false positive meter event.

\* \* \* \* \*